(12) United States Patent
Lorang

(10) Patent No.: US 8,306,479 B1
(45) Date of Patent: Nov. 6, 2012

(54) POLARIZATION CONTROL FOR CELL TELECOMMUNICATION SYSTEM

(75) Inventor: Malcolm M. Lorang, Dallas, TX (US)

(73) Assignee: Metropcs Wireless, Inc., Richardson, TX (US)

( * ) Notice: Subject to any disclaimer, the term of this patent is extended or adjusted under 35 U.S.C. 154(b) by 0 days.

(21) Appl. No.: 13/543,233

(22) Filed: Jul. 6, 2012

(51) Int. Cl.
*H04B 17/00* (2006.01)
(52) U.S. Cl. .................................. 455/67.11
(58) Field of Classification Search ............... 455/67.11
See application file for complete search history.

(56) References Cited

U.S. PATENT DOCUMENTS

| | | | |
|---|---|---|---|
| 2008/0227405 A1* | 9/2008 | Harel et al. | 455/69 |
| 2009/0315412 A1* | 12/2009 | Yamamoto et al. | 307/149 |
| 2012/0208467 A1* | 8/2012 | Wang et al. | 455/42 |

* cited by examiner

*Primary Examiner* — Duc Nguyen
*Assistant Examiner* — Ankur Jain
(74) *Attorney, Agent, or Firm* — Howison & Arnott, L.L.P.

(57) ABSTRACT

A base station for use in a wireless communications system is disclosed, including transceiver circuitry for transmitting and receiving with at least one mobile device over at least one communications channel. Polarization control logic is included for controlling a polarization of signals transmitted over the at least one communications channel. The polarization control logic adjusts a polarization of the signal transmitted on the at least one communications channel responsive to at least one parameter received from the mobile device relating to a quality of signal received on the at least one communications channel.

11 Claims, 6 Drawing Sheets

POLARIZATION CONTROL FOR CELL TELECOMMUNICATION SYSTEM

TECHNICAL FIELD

The present invention relates in general to cellular telecommunication systems and, more particularly, to the method and apparatus for controlling the power level translated between the base station and a mobile unit.

BACKGROUND

Power control (PC) is an essential function of cellular telephone systems such as CDMA systems and WCDMA systems, as well as follow on systems thereto. It is important that the power transmitted from a base station (BS) to a mobile unit (MU) be closely controlled such that it is sufficiently high enough to ensure that the required communications and performance is achieved. This is also the case with respect to power transmitted from the MU to the BS. If more power is transmitted than is required, the MU, for example, will be required to utilize more of its battery power. The BS, although not being powered by battery, does have overall power requirements that need to be met as well. Thus, by reducing the amount of total power that is required to be transmitted to the maximum number of mobile units that could possibly be interfaced with the BS, a more efficient system could be utilized with optimized power supplies, etc.

Power control is facilitated utilizing only the traffic and access channels. The power levels transmitted from MUs to their BSs are very closely controlled, typically utilizing multiple control loops to ensure that just enough, but not too much, power is transmitted. One loop is utilized for open loop control and it is based on the level of power received over the total physical channel bandwidth. A second loop is comprised of a closed loop which utilizes measurements of power on reverse traffic channels to determine if the reverse-link is approximately at the level required. If it is not, a one-bit control message is sent out on the forward traffic channel to adjust the power of a particular link. A third loop can be utilized, usually called the outer loop, which appraises the overall performance of the closed loop using the reverse-link frame quality statistics. Internally, the parameters that are examined are typically such things as the Signal-to-Interference Ratio (SIR) and the bit error rate (BER).

One problem that exists with respect to a cellular telephone system which has a plurality of MUs disposed in the proximity to a particular BS is that the MUs can migrate into different microenvironments. For example, two MUs can be separated by a distance of 10 feet and be in a completely different environment due to the surrounding features of that environment. For example, one person may be outside of a building and the other person may be 10 feet away on the inside of the building looking out of a window. The communication properties between those two MUs are significantly different. This can be further exacerbated in a CDMA system wherein both MUs receive on substantially the same frequency utilizing only Welch codes to distinguish two people talking at the same time. This is facilitated by controlling the power on a per user basis. When an individual steps inside of a building the attenuation caused by the building will be compensated for by the MU requesting higher power to be transmitted from the BS and for the BS requesting higher power to be transmitted from the MU. This is fairly conventional.

One other factor with respect to these microenvironments is that the characteristics of the electromagnetic wave are varied as a result of the surrounding environment. Some of these characteristics are due to reflections which can change the polarization. For example, if a signal is reflected from a building, polarization could be rotated from a conventional vertical polarization to lead or lag that polarization. Since the handset corresponding to the MU is typically on the average expecting vertical polarization, this will result in some attenuation which will require a power increase in the overall band of interest in order to gain acceptable communications performance. This is also the case when entering the building, as the building itself will constitute a phase shifter. This is in addition to the attenuation of the building itself. The only solution at the present time is to utilize the power control features of the cellular communication system to facilitate the change.

SUMMARY

The present invention disclosed and claimed herein comprises, in one aspect thereof, a base station for use in a wireless communications system, including transceiver circuitry for transmitting and receiving with at least one mobile device over at least one communications channel. Polarization control logic is included for controlling a polarization of signals transmitted over the at least one communications channel. the polarization control logic adjusts a polarization of the signal transmitted on the at least one communications channel responsive to at least one parameter received from the mobile device relating to a quality of signal received on the at least one communications channel.

BRIEF DESCRIPTION OF THE DRAWINGS

For a more complete understanding, reference is now made to the following description taken in conjunction with the accompanying Drawings in which.

DETAILED DESCRIPTION

Figure 1:
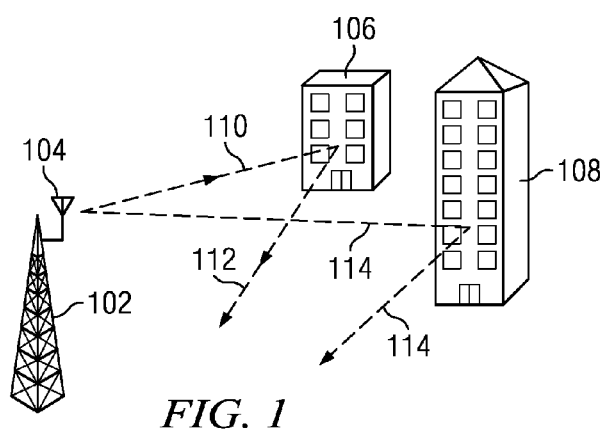
FIG. 1 illustrates a diagrammatic view of a base station and multiple buildings in the locale of a particular base station.

Referring now to the drawings, wherein like reference numbers are used herein to designate like elements throughout, the various views and embodiments of a polarization control for cell telecommunication system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic perspective view of a base station transmitting within a locale occupied by multiple buildings. The base station is illustrated by a tower 102 having an antenna 104 associated therewith. The antenna 104 is operable to transmit signals on various frequencies with various modulations. There are multiple cellular telephone schemes such as CDMA, WCDMA, GSM, UTS, etc. that can be utilized, depending upon the system for which the base station is configured. In any event, no matter what system is utilized, power is still required to be transmitted on a particular frequency at a particular level. Typically, when the signal falls below a certain level such as −106 dBm, a particular mobile unit will not be able to receive the signal, as the receiver associated therewith has a lower limit of receive sensitivity. Thus, it is important that the transmitter at the base station be able to transmit sufficient power to reach the periphery of the outer region or limits of the base station at that level. Of course, when a mobile unit is closer, the power must be adjusted downward. Further, it can be seen that, depending upon the microenvironments that exist in various portions of the base station locale, all or a portion of the signal energy can be attenuated or reflected.

In FIG. 1, there are illustrated two buildings 106 and 108. A signal that is transmitted from the antenna on the Base Station is transmitted in an omnidirectional manner such that it is transmitted in all directions at once. Therefore, a transmitted signal will be directed toward building 106, as seen by transmission path 110 which is reflected along a path 112. Similarly, a signal is transmitted along a path 114 and reflected off of building 108 to provide a signal on a reflective path 114. If there were a mobile unit in the region of both of the reflective waves, it would also receive a direct transmitted signal from the antenna 104 and must be able to distinguish among these different signals.

The transmitted wave from the antenna 104 will have a set of electromagnetic properties. These properties will include the power of the electromagnetic wave and the polarization of an electromagnetic wave, i.e., the orientation thereof, and the phase thereof. In an ideal world, with no buildings in the line of sight and no environmental impediments, a mobile unit will always be within the line of sight of a Base Station and will receive the signal with substantially no interference. There will be no "ghosting" that will result in multiple signals at the same frequency for the same modulation directed to the same mobile unit that are reflected from different objects. However, in a real world environment, not only will reflected waves be received from multiple other objects, but the transmitted signal that is received will be received with different electromagnetic properties due to the reflections thereof which can change the properties.

Figure 2A:
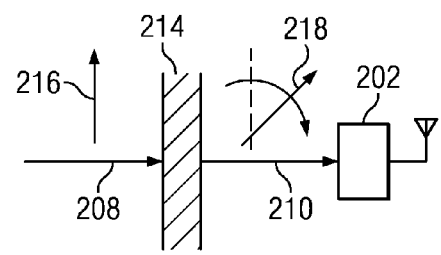
FIG. 2a illustrates the detail of the change in transmission medium between the inside and the outside of a building.
Figure 2:
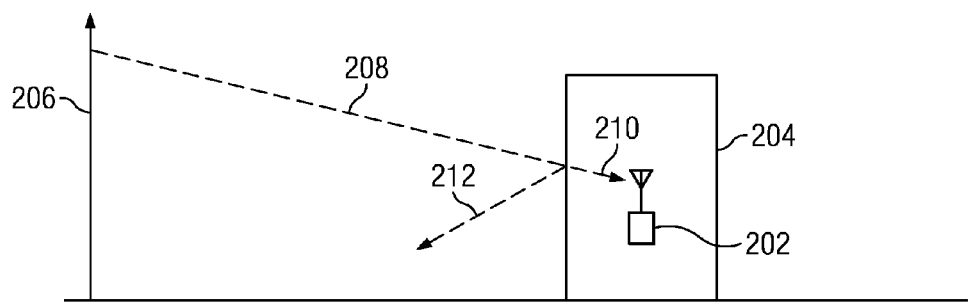
FIG. 2 illustrates a diagrammatic view of a transmission to a mobile unit within a building.

Referring now to FIG. 2, there is illustrated a diagrammatic view of a mobile unit 202 disposed within the interior of a building 204. A transmitter 206 is operable to transmit a signal along a transmit path 208 to the building 204. When it arrives at the boundary of a building between the base station transmitter 206 and the mobile unit 202, two things will happen. First, the transmitted signal will encounter a change in transmission medium. If the mobile unit were disposed on the opposite side of a glass window, for example, the transmission medium would go from air to glass to air. At this transmission medium boundary, the transmitted signal would be divided into a transmitted portion 210 and a reflected portion 212 due the different properties at the boundary. The transmitted portion 210 will have the electromagnetic properties thereof changed as a result of the transmitted signal along path 208 encountering the transmission medium boundary. One change that occurs is that the polarization may vary. Typically, the polarization for a cellular system is vertical linier polarization. The reason for utilizing vertical linier polarization is to better cover ground based mobile units. As compared to horizontal polarization which provides for better coverage of line of sight receiving units on roof tops, i.e., television based signals, the vertical polarization covers the ground based units more completely. As a receiver is moved closer to the earth for horizontal polarization, the signal is attenuated, which is the opposite for vertical polarization. However, it should be understood that the mobile unit is designed to operate in a communication system wherein the antenna utilizes vertical polarization. Even though the polarization may be shifted to either lead or lag the nominal vertical polarization, on the average, the mobile unit is designed to provide adequate performance for substantially all orientations. Even the antenna designed for the orientation of a mobile unit when utilizing a conversation mode is typically designed such that it will be oriented with respect to the vertically polarized transmitting antenna during a normal call assuming an individual will always hold it the same way. However, if the mobile unit or phone is rotated such that attenuation does occur due to a shift in polarization, this will be compensated for in the conventional prior art system by adjusting the power level through the power control portion of the system. This could result in additional power being transmitted from the mobile unit or additional power being transmitted from the base station or both.

This polarization aspect is illustrated in FIG. 2a wherein the transmitted signal 208 is transmitted through a wall 214 with the original polarization being vertical, as illustrated by a vertical arrow 216. Once passing through the wall 214, the transmitted path 210 has a polarization 218 that leads the vertical polarization 216, i.e., it is rotated in phase. This will be received at the mobile unit 202 with slightly attenuated properties. This is due to the fact that the electromagnetic properties of the transmitted signals have been changed and, when the signal arrives at the receiving antenna on the mobile unit 202, the change in those electromagnetic properties result in less than optimum reception at the receiving antenna. The receiver in the mobile unit 202 does not have the sophistication to make a determination that the electromagnetic properties have been altered; rather, all that the receiver in the mobile unit 202 can determine is signal strength. Typically, the antenna will feed an input band pass filter that will pass frequencies within the pass band of that filter, which will then be fed to a low noise amplifier and then processed to a receive string. Signal strength can be detected and measured above a predetermined level to make sure that at least a moderate level of signal power has been received. Thereafter, the received demodulated signal can be examined to determine if there were any errors. Typically, one can look at error rates such as the SIR and the BER to determine if data has been correctly received. If the error rate is too high, the assumption is made that there is an issue with respect to power and some action is taken to increase the transmit power along the path 210. This error rate can be due to attenuation, phase shift, collision or any other reason. The simple fact is that current systems merely attempt to solve error rates by increasing power. This, of course, causes other problems with respect to adjacent channels but telecommunication protocols such as CDMA, GSM, etc. allow for power control on a per user basis.

As will be described herein below, rather than utilize the power control features of the various telecommunications systems or telecommunication protocols, the present disclosed embodiments attempt to correct for changes in the electromagnetic properties of the transmit signal. If the error rates can be improved by altering the transmission properties of the transmitted signal both to the mobile unit 202 and to the base station from the mobile unit 202, then additional power is not required. (Although the embodiment of FIG. 2 and FIG. 2a only discuss transmitted power from the base station to the mobile unit, it should be understood that there is a return link from the mobile unit to the base station and electromagnetic properties of such a signal will vary as various transmission boundaries with respect to medium are encountered.) The change in these properties is facilitated by changing the way in which the antenna can transmit. As noted herein above, the base station will typically utilize a vertical linear polarization. By changing the polarization of the transmitted signal at the antenna through phase control, the polarization can be rotated at the antenna itself to actually adjust the polarization of the received signal at the receive antenna to match the characteristics of the receive antenna. If, for example, the polarization at the mobile unit leads the polarization at the antenna at the base station by 45°, for example, then it is only necessary to rotate the phase at the antenna to lag the vertical polarization by 45°. This will compensate for the polarization shift along the transmission path and, therefore, improve the error rates and the reception at the receiver in the mobile unit 202.

Figure 3:
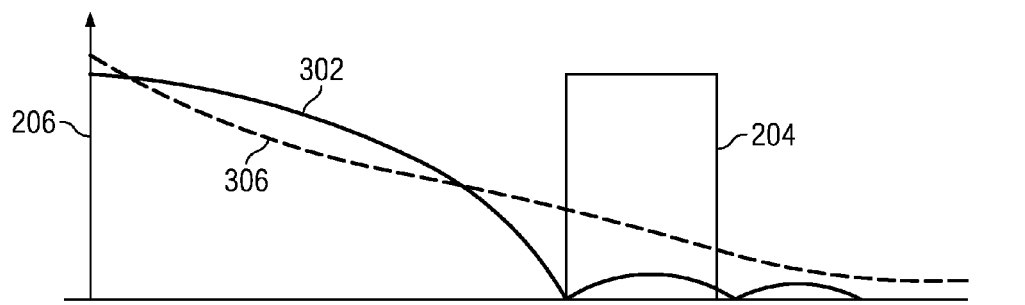
FIG. 3 illustrates different polarization schemes for transmission through a building.

Referring now to FIG. 3, there is illustrated a diagrammatic view of various polarization patterns and the transmission properties with respect thereto. The transmitter 206 transmits the electromagnetic waves with vertical linear polarization 302 in one mode and with horizontal polarization 306 in another mode. It can be seen that the vertical polarization is more conducive to line of sight transmission close to the ground as opposed to horizontal polarization which penetrates buildings more efficiently. Thus, the closer a mobile unit is to a building, the more attenuation that will occur. By changing the polarization, it can be seen that the amount of power transmitted through the building will increase.

Figure 4:
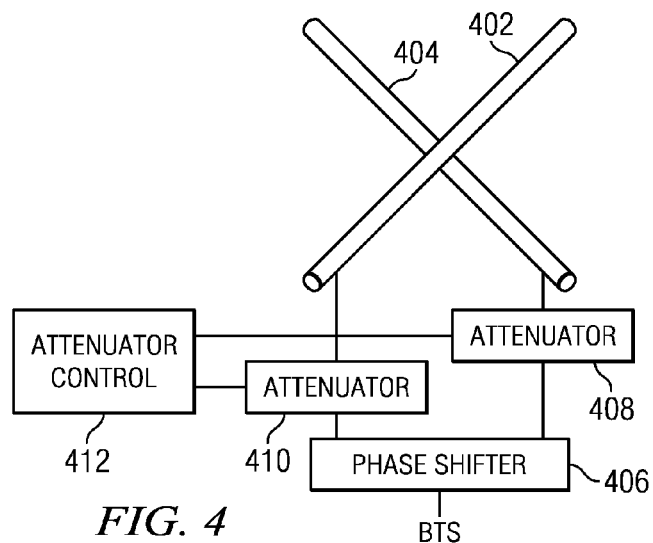
FIG. 4 illustrates a diagrammatic view of phase control for a base station antenna.

Referring now to FIG. 4, there is illustrated a diagrammatic view of one embodiment wherein the antenna at the base station has the phase thereof modified to vary the polarization on the transmit signal. This will effectively manage the power level at the transmitter thus potentially reducing the power requirements for a given base station. In this embodiment, two E-field antennas 402 and 404 are provided in an orthogonal cross-configuration. This will result in vertical polarization if they are phased correctly. The base station transmitter generates a signal that is input to a phase shifter 406 which is operable to adjust the relative phase to a first attenuator 408 that drives the antenna 404 and the second attenuator 410 drives the antenna 402. By varying the difference between the phase, up to 90°, the polarization could be varied from vertical to horizontal. There is also provided an attenuation control block 412 to vary the power delivered to the antenna for a particular channel. As noted herein above, for each mobile unit, a call can be connected using, for example, a CDMA protocol. However, when two mobile units are communicating on the same frequency, they can be accommodated utilizing Welch coding. However, the carrier is the same and, as such, the polarization can only be varied for one of the mobile units. As such, in a situation like this, a decision would have to be made to accommodate both of the mobile units, i.e., the polarization might be varied half way between the needs of both.

Although two E-field antennas are illustrated, it is possible to use one E-field antenna and one H-field antenna. Also, two orthogonal ring antennas could be utilized. What is utilized to vary the electromagnetic properties of the transmitted signal is some type of antenna control to vary the electromagnetic properties of the antenna. Alternately, the actual physical orientation of the antenna could be changed. However, this would not be feasible on a per-user basis but, rather, only on an overall gross adjustment. This would not be done more than once or twice in a short period of time. Additionally, there may be other electromagnetic properties that could be varied to better match the transmitted signal to the receive signal within the particular transmission medium in which the signal is transmitted. Even multiplexing of different physical antennas could be utilized. Although polarization is illustrated as the electromagnetic property to be manipulated, other techniques are contemplated.

Figure 5:
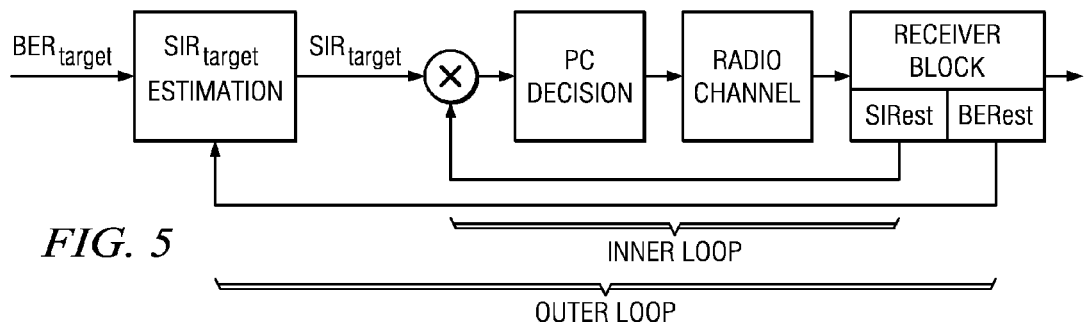
FIG. 5 illustrates a diagrammatic view of the control loop for power control in a WCDMA system.

Referring now to FIG. 5, there is illustrated a diagrammatic view of the power control scheme for WCDMA. This is essentially a closed loop power control (PC) which is a combination of outer and inner loop closed loop control. The inner (also called fast) closed loop PC adjusts the transmitted power in order to keep the received Signal-to-Interference Ratio (SIR) equal to a given target value. This SIR target is fixed according to the received BLER (Block Error Rate) or BER (Bit Error Rate). The setting of the SIR target is done by the outer loop PC, which is part of a radio resource control layer, in order to match the required BLER. The update frequency of the outer loop PC is approximately 10-100 Hz. The BLER target is a function of the service that is carried. Ensuring that the lowest possible SIR target is used results in greater network capacity.

The inner closed-loop PC measures the receive quality, defined as the received SIR and sends commands to the transmitter (i.e., the mobile unit in the case of an uplink and the base station in the case of a downlink) for the transmitted power update. In order to estimate the received SIR, the receiver estimates the received power of a connection to the power control and the received interference. The obtained SIR estimate (noted $SIR_{est}$) is then used by the receiver to generate PC commands according to algorithms set forth in the 3GPP specification, (3GPP TS 25.214 v 4.1.0 2001-06) "physical layer procedures (FDD) (release)." In one of these algorithms, the transmitted power is updated at each of one of a plurality of time slots, these time slots being 10 or 15 ms. It is increased or decreased by a fixed value. If $SIR_{est}$ is greater than $SIR_{target}$, then the command sent to the other end is a "0" requesting a transmit power decrease. If the $SIR_{est}$ is less than $SIR_{target}$, then the command transmitted is a "1" requesting a transmit power increase. The second algorithm of 3GPP is a slight variant of the first algorithm, wherein the transmitted powers may be updated every five time slots, which simulates smaller power update steps.

The power control step size is a parameter of the fast (inner) closed loop PC. In the case of the uplink, it is equal to 1 or 2 dB in the WCDMA system. Values smaller than 1 dB can be emulated by taking larger PC update periods for the second algorithm. The power update step size may be chosen according to the average mobile speed and other operating environmental parameters. For the down link, power update step sizes of the same magnitude could be utilized.

Figure 6:
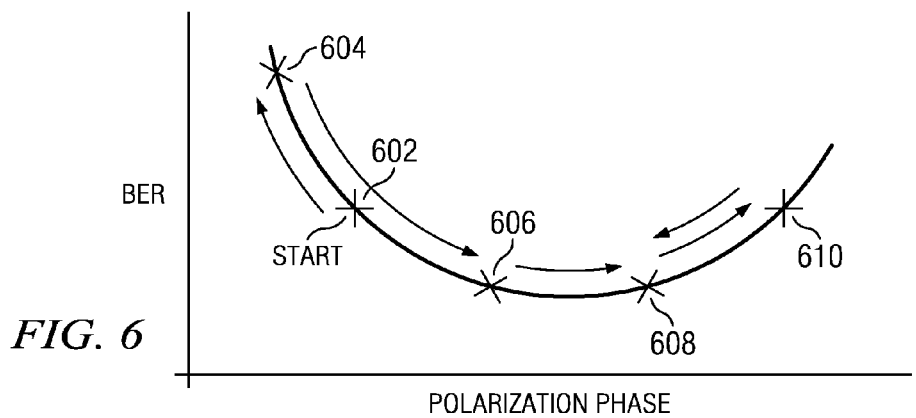
FIG. 6 illustrates a plot of the polarization phase versus the Bit Error Rate.

The difference between the phase control and the power control is that a command is sent from the mobile unit to the base station to change the phase. The mobile unit can, in one embodiment, alternate between power and phase by first requesting a phase change to optimize the phase, followed by the conventional power control algorithm. For the phase control algorithm, the outer loop is controlled by analyzing the BER or even the Frame Error Rate (FER) to determine if there is an error above a predetermined threshold. This threshold is the target threshold period and, if the error rate is below the target threshold, a request for a phase change is sent. The phase is changed and then the BER or FER evaluated. If it is worse, a command is sent to reverse direction of the phase change. The base station will then increment two increments, i.e., it will erase the first change and make a change in the opposite direction. If the BER or FER improves, then a signal is sent for an additional change in that direction and this will continue until the Bit Error Rate decreases, at which time a command will be sent to reverse the direction. This will be interpreted by the base station as fixing the phase as that is the operable phase for this instant in time. The mobile unit will then switch over to the power control algorithm and then optimize the power. Thus, the decision as to the base controller is made by evaluating the BER of the received signal and adjusting the phase in one direction or the other until the appropriate minima in error has been achieved. This is illustrated in FIG. 6 wherein the Bit Error Rate is evaluated at a point 602 in the polarization phase. The move is made in the wrong direction to a point 604 in the polarization phase which increases the BER. Thus, a move will then be made at a point 606 in the polarization phase and the BER evaluated. Then a move will be made to a point 608 in the polarization phase. At point 608, the BER is approximately the same so an additional move may be made to a point 610 in the polarization phase to again evaluate the BER to determine if it in fact has worsened and, if so, this indicates that a move can be made back to point 608 or point 606 in the polarization phase. This is basically a curve fitting algorithm to determine the minima of the BER as a function of the polarization phase. It may be that the polarization phase can be dithered between point 606 and point 608. In any event, for this particular mobile unit, this will be the best polarization phase.

Figure 7:
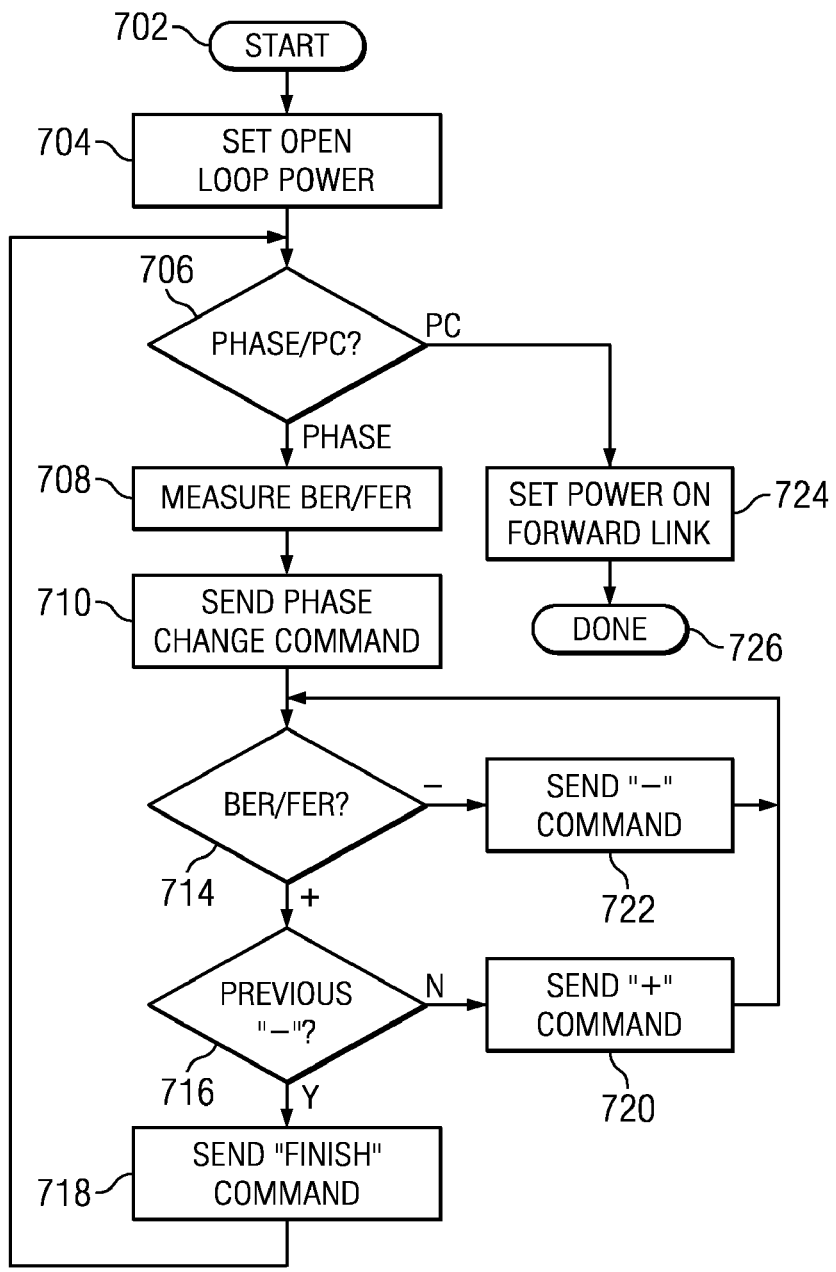
FIG. 7 illustrates a flow chart for the overall operation of setting either the power or the phase control.

Referring now to FIG. 7, there is illustrated a flow chart depicting one scenario for varying the electromagnetic properties, vertical linear polarization in one example, at the base station. The program is initiated at a block 702 and then proceeds to a block 704. At block 704, the open loop power is set. The open loop power, as described herein above, relates directly to the path loss. As the name suggests, this control has no feedback and it simply sets the initial power at which the mobile unit should transmit. In this manner, the mobile unit can at least receive information from the base station. The program then flows to a decision block 706 to determine if the phone is in the phase control mode or the power control mode. Either mode can be set as the default mode with the following mode being the other. In this embodiment, the phase mode is set as the default mode and the program will flow along the phase path from the decision block 706 to a function block 708 to measure the error rate, either the BER or the FER. It should be understood that the mobile units are legacy units, since most cellular systems have a lot of flexibility with respect to the base stations but the hardware in the mobile units is fairly well fixed and defined by manufacturers of the equipment. Typically, the base station will have more flexibility than the mobile unit. As such, the only available indicator of some parameter that can be improved by increasing power is the error rate of the data. If there is an issue with respect to an error rate, be it the BER or the FER, an increase in power can sometimes improve this. Thus, the measurement of the BER/FER provides an indication that the power can be reduced or increased. As described herein, the power is controlled by changing the phase of the antenna, i.e., the electromagnetic properties thereof, in order to improve the power delivered to the mobile unit.

Once the BER/FER is measured at the function block 708, the program flows to a function block 710 to send a phase change command to the base station. This is facilitated via a control channel. This is similar to a request for an increase in power or a decrease in power. This phase change command is interpreted at the base station as a request to enter into a particular mode for changing the phase. However, the base station has no knowledge of whether the phase should be changed in a leading direction or a lagging direction. Thus, one direction or the other would be chosen as the default direction. It may be that the increments are in 1° increments, 5° increments or 10° increments. This is up to the designer of the system. Once the phase change command has been sent, the base station will change the phase. The program at the mobile unit will then flow to a decision block 714 to again determine if the BER/FER changes in a positive direction or a negative direction. If in the positive direction, this indicates that the error has increased and then the program will flow to a decision block 716 to determine if the previous change in the BER/FER were a negative change. If so, this would indicate to the overall system that the minima had been achieved in the last phase change. If so, the program will flow along a "Y" path to a function block 718 wherein a "finish" command would be sent back to the base station. When the base station receives this finish command, it would know that the last change caused the error rate to increase and it would jump back to the last phase value. The program then would be returned back to the input of the decision block 706. However, if at the decision block 716, it was indicated that the last change had not resulted in a decrease in the error rate, then the program would flow to a function block 720 to send a "+" command back to the base station. This would indicate to the base station that it had changed the phase in the wrong direction. This would cause the base station to change the direction of phase change and possibly jump back two increments such that it would pass through the last increment, and then the program would flow back to the decision block 714 to make a change in the opposite direction. Again, the BER/FER would be checked and, if it again changed in the positive direction, i.e., the error rate increased, this will result in again the "+" being sent back to the base station. This will continue until the BER/FER decreases, at which time the program would flow to a function block 722 in order to indicate to the base station that the direction was correct and this would continue until the BER/FER increased, which would cause the program to flow along the path to the function block 718.

When the "finish" command is sent, as indicated by the function block 718, the program flows back to the input of the decision block 706, this changes the mode to the power control mode. This would cause the program to flow from the decision block 706 to a function block 724 in order to set the power on the forward link. This is the conventional process for optimizing the communication link.

Figure 7A:
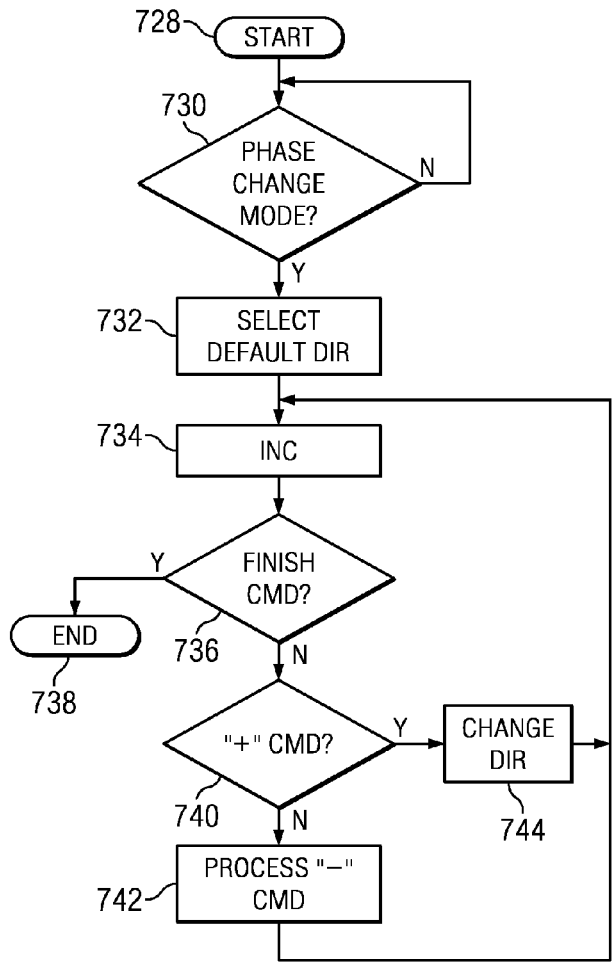
FIG. 7a illustrates a flow chart for the operation at the base station to change the phase of the polarization.

Referring now to FIG. 7a, there is illustrated a flow chart depicting the operation of changing polarization from the view point of the base station, which is initiated at a block 728 and then proceeds to a decision block 728 and then proceeds to a decision block 730. The decision block 730 determines if the phase change mode has been selected. This is done in response to receiving the phase change command along the control channel from the mobile unit. The program then flows along the "Y" path 732 in order to select a default direction. As noted herein above, either direction could be utilized, as the polarization of the signal is unknown. Again, this particular example deals with polarization as being the change in the electromagnetic property that is being altered. However, it should be understood that any other property of an electromagnetic signal could be altered in order to improve the power or the reception at the antenna.

Once the default direction has been sent, the program flows to a function block 734 in order to increment the phase. The program then flows to a function block 736 to wait for a command from the mobile unit. If it is the finish command, the program flows along the "Y" path to an END block 738, as this is indicated as being the minima. If the finish command is not received, the program flows to a decision block 740 to determine if the "+" command was received. If so, the program flows along a "Y" path and the direction is changed at function block 744 in the opposite direction, as this is an indication that the BER/FER is increasing. The program then flows to a function block 734 to increment the phase change. However, the increment aspect of function block 734 will be changed to increment by two in the opposite direction, in one example.

If the "+" command was not received at decision block 740, the program will flow along the "N" path to a function block 742 in order to process the "−" command, as this command would have been received if the finish command or the "+" command had not been received. The command will be processed by going back to the input of function block 734 to increment the phase. This will, of course, continue until the finish command is received.

Figure 8:
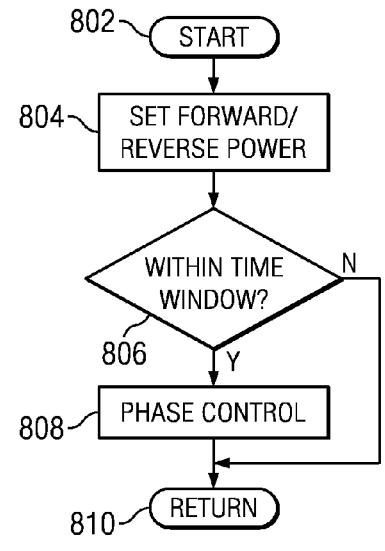
FIG. 8 illustrates a flow chart for one scenario wherein the power control precedes the phase control and the phase control only occurs within a valid time window.

Referring now to FIG. 8, there is illustrated a flow chart depicting another scenario as to when the power control and the phase control are sequenced. This is initiated at a block 802. The program then flows to a function block 804 and the forward/reverse power are set along the forward link and the reverse link. This is the conventional operation. The program then flows to a decision block 806 to determine if a particular time window is present. This time window is a predefined time window during which the phase changes to the polarization will be effected. If the system is within the time window, the program will flow along the "Y" path to a function block 808 to process the phase control algorithm. If not, the program will flow along an "N" path from the decision block 806 around the function block 808. Both will flow to a return block 810.

Figure 9:
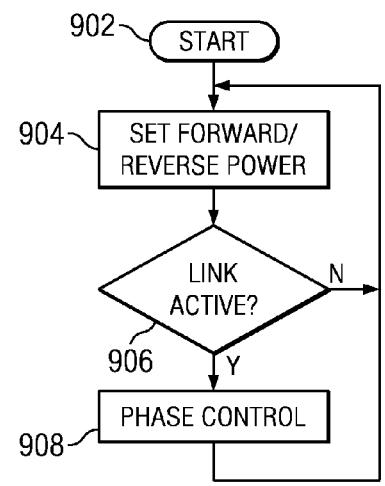
FIG. 9 illustrates a flow chart wherein the phase control is only performed during an active link.

Referring now to FIG. 9, there is illustrated a flow chart depicting an alternate embodiment when the power control and phase control are sequenced. This is initiated at a block 902 and the proceeds to a function block 904 to set the forward/reverse power, similar to the block 804. The program then flows to a decision block 906 to determine if the link is active, i.e., if there is an active call on that link. If so, the program will follow a "Y" path to a function block 908 to process the phase control algorithm to vary the polarization angle of the base station. The program will then flow back to the input of the function block 904. If the link is not active, the program flows along an "N" path from decision block 906 to the input of decision block 904.

Figure 10:
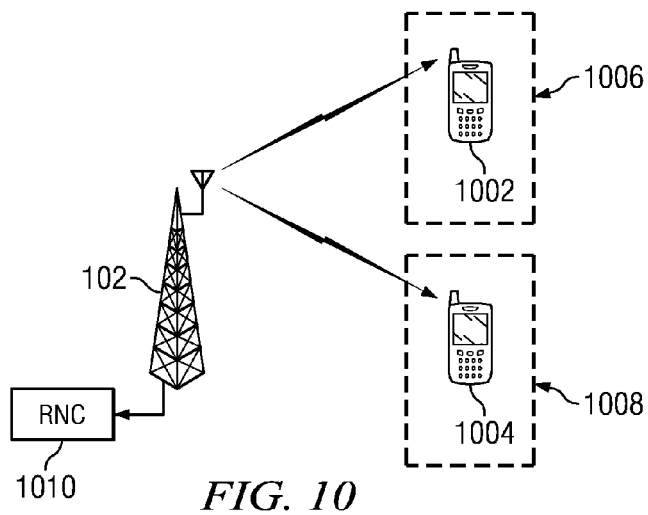
FIG. 10 illustrates a diagrammatic view of a near/far link wherein two mobile units share a common frequency.

Referring now to FIG. 10, there is illustrated a diagrammatic view of a cellular system utilizing polarization control at the base station wherein there are two mobile units 1002 and 1004, each disposed within a separate microenvironment 1006 and 1008, respectively. Both of these microenvironments are different such that the effective power levels transmitted along the forward link to each of the mobile units 1002 and 1004 differ, specifically as a result of a polarization change in the vertical linear polarization of the antenna. The problem is that both of these may be on the same channel. The reason for this is that both of these units being on the same channel have a problem in that they are not in a time diverse slot, i.e., they both receive the communication at the same time slot on the same frequency. Current WCDMA systems provide for power control on a per mobile unit basis but do not provide for separating communication and time. In this case, although Welch coding can be utilized to distinguish the calls, the polarization must be averaged between the two units. This procedure would require one unit to determine its optimum polarization and then the second unit to determine its optimum polarization. The base station would then select a polarization that would provide a selection between the two. This is effected via the central RNC (Radio Network Control) block 1010.

Figure 11:
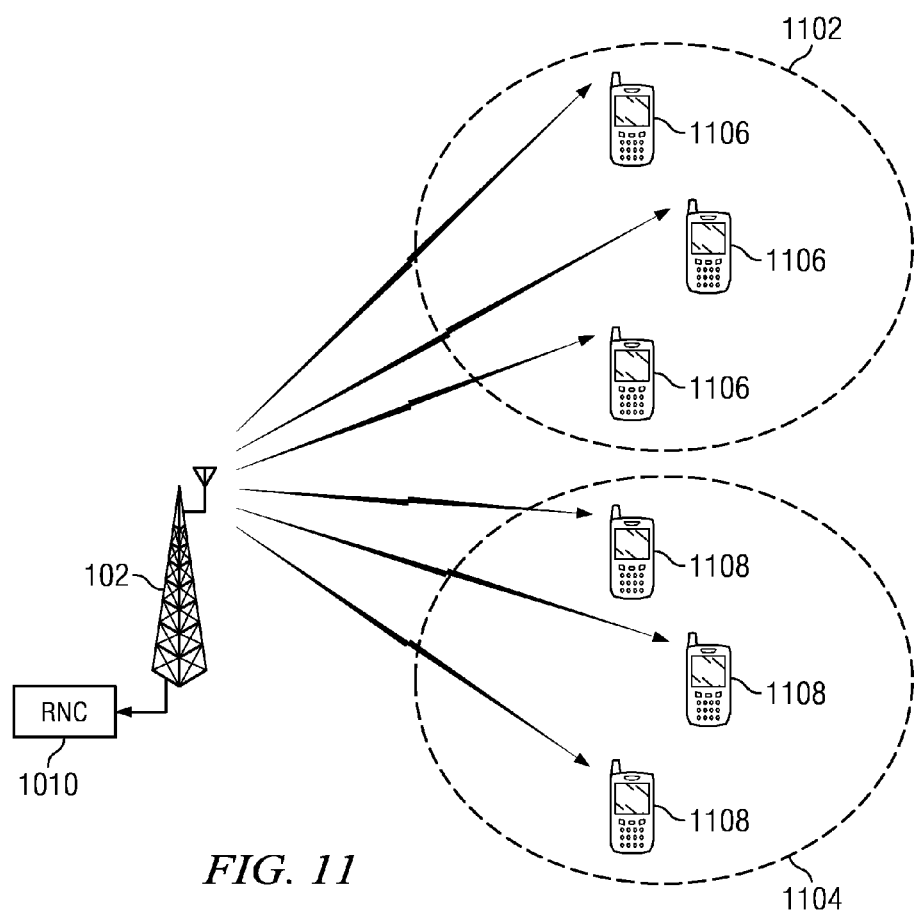
FIG. 11 illustrates a diagrammatic view of a clustering algorithm.

Referring now to FIG. 11, there is illustrated an alternate embodiment wherein the base station 102, instead of providing control on a mobile unit by mobile unit basis, provides the control in aggregated sections. The aggregated sections are illustrated as two sections 1102 and 1104. The section 1102 is a geographical area wherein a plurality of mobile units 1106 are disposed. Each of these mobile units 1106 will operate in similar surroundings, i.e., the polarization for each of these is not that different. It may be that the polarization change or the optimum polarization can be determined for all of the units 1106 and they all have a similar polarization change. Therefore, when transmitting to this section, the polarization will be selected for that aggregated group of mobile units. Thus, only one polarization change needs to be determined for those mobile units. This is similar with respect to the section 1104 having a plurality of mobile units 1108 disposed therein. In some systems, the antenna can be "sector," such that the certain sections of the area can be called out.

Figure 12:
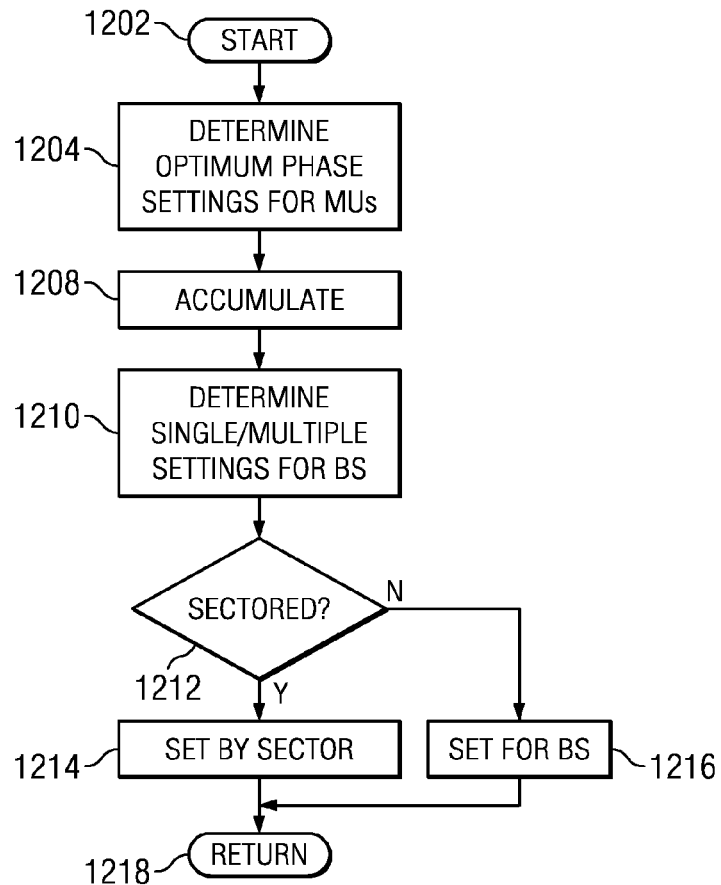
FIG. 12 illustrates a flow chart depicting the operation of aggregating a plurality of mobile units and determining the setting of the polarization of the antenna based upon statistics from the plurality.

Referring now to FIG. 12, there is illustrated a flow chart depicting the aggregation of mobile units. In this scenario, which is initiated at a block 1202, the base station will collect data from all of the mobile units within this area or from a defined sample set. It may be a random sample set based on time or it may be based on a command somewhere on the control channel from the base station for every $100^{th}$ mobile unit that requests a power control change. This would provide some indication to the base station of a possible desired polarization which statistically a large number of the phones would be requesting. Therefore, the program would flow to a function block 1204 wherein an optimum phase would be determined for particular mobile units within the set or within the entire system. It could be that some of the legacy phones are more adaptable to polarization and these phones would be utilized. This information is then accumulated in a function block 1208 and then the program flows to a function block 1210 to determine the setting for the base station. This could be multiple settings which would change over time or could be a single setting that was based upon the phones, the assumption being that once the polarization is changed, the microenvironments would have better receptions and the change was not required on a frequent basis. The program then flows to a decision block 1212 to determine if this is a sectored system. If so, the program flows along a "Y" path to set the polarization by the sector, as indicated by a function block 1214 or along an "N" path to a function block 1216 to set the polarization change for the entire base station. The program will then flow to a return block 1218.

Figure 13:
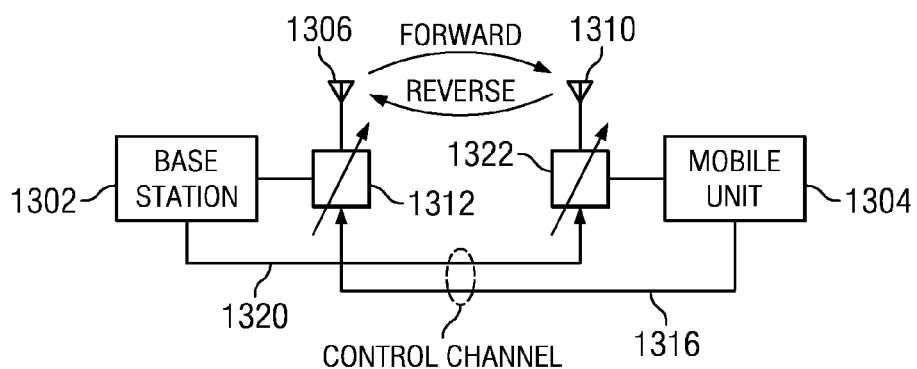
FIG. 13 illustrates a simplified diagrammatic view of the control aspect of setting the polarization on either end of the communication link.

Referring now to FIG. 13, there is illustrated a diagrammatic view of the overall system which requires a base station 1302 and a mobile unit 1304. As noted herein above, the base station 1302 has an antenna 1306 which has certain electromagnetic properties that are fixed by the associated transmitter and the physical structure of the antenna. This, of course, can be changed across the forward link when it impinges an antenna 1310 of the mobile unit 1304. As described herein above, the base station is the most flexible device in conventional cellular telephone systems. Thus, the electromagnetic properties thereof can be varied, as indicated by a variation block 1312 to vary the electromagnetic properties of the forward link. This is facilitated via a control channel 1316. This control channel allows the mobile unit 1304 to monitor its signal strength and certain parameters of the received data to make a determination that power should be increased. The base station 1302, in conjunction with the mobile unit 1304, will effectively change the electromagnetic properties of its antenna 1306. However, alternatively, the reverse link could be further controlled to coordinate with the base station such that the base station could send command signals along a command channel 1320 to mobile unit 1304 which has a variation block 1322 associated with its antenna 1310. The electromagnetic properties of the antenna 1310 could be varied to further reduce the power of the reverse link. This would significantly reduce the amount of power that is required to be transmitted by the mobile unit 1304, thus reducing the drain on its battery. Thus, either link could be controlled and either transmitter could be controlled to optimize the electromagnetic properties at the receiving antenna. Also, as noted herein above, this would require a fairly flexible mobile unit 1304 that would have the ability to vary the properties of its antenna. This, of course, is not practical with respect to legacy units but future units could be adapted for such.

It will be appreciated by those skilled in the art having the benefit of this disclosure that this polarization control for cell telecommunication system provides an alternate technique to improve reception in varying environments without increasing power. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for improving a connection parameter relating to a connection between a base station and at least one mobile station, comprising:
   detecting receipt of a first phase change command at the base station from the at least one mobile station;
   changing a phase of transmissions from the base station to the at least one mobile station in a first direction responsive to the first phase change command;
   detecting receipt of a second phase change command at the base station from the at least one mobile station after changing the phase of the transmissions from the base station to the at least one mobile station;
   changing the phase of transmissions from the base station to the at least one mobile station responsive to the second phase change command, wherein the second phase change command indicates a phase change in the first direction or in the second direction;
   maintaining the phase of transmissions from the base station to the at least one mobile station responsive to the second phase change command comprising a finish command;
   determining whether a value of the connection parameter increased or decreased responsive to transmissions from the base station having the phase changed in the first direction;
   generating the second phase change command to change the phase of transmissions in the first direction and second direction responsive to a determination that the value of the connection parameter decreased and increased, respectively; and
   repeating the determining and generating steps until a minimum value of the value of the connection parameter is determined.

2. The method of claim 1, wherein the step of changing the phase of transmissions from the base station to the at least one mobile station responsive to the second phase change command further comprises the step of further changing the phase of transmissions from the base station to the at least one mobile station in the first direction responsive to the second phase change command.

3. The method of claim 1, wherein the step of changing the phase of transmissions from the base station to the at least one mobile station responsive to the second phase change command further comprises the step of changing the phase of transmissions from the base station to the mobile station in a second direction responsive to the second phase change command.

4. The method of claim 1, wherein the step of changing the phase of transmissions from the base station to the at least one mobile station in the first direction responsive to the first phase change command further comprises the steps of:
   aggregating the first phase change command from the at least one mobile station; and
   determining the first direction for the phase change responsive to the aggregation of the first phase change command.

5. The method of claim 1, wherein the steps of detecting further comprise detecting on a command channel between the base station and the at least one mobile station.

6. The method of claim 1, wherein the steps of changing further comprise the step of changing the phase of transmissions on a communications channel from the base station to the at least one mobile station.

7. The method of claim 1, wherein the connection parameter comprises a bit error rate.

8. The method of claim 1, wherein the connection parameter comprises a frequency error rate.

9. A method for improving a connection parameter relating to a connection between a base station and a mobile station, comprising:
   measuring a value of the connection parameter at the mobile station;
   generating a plurality of phase change commands to request the base station change a phase of transmissions from the base station to the mobile station in a determined direction until the value of the connection parameter reaches a minimum value;
   transmitting a finish command to the base station responsive to the measured value of the connection parameter reaching the minimum value;

wherein the step of generating further comprises the steps of:
(a) generating a first phase change command to request the base station change the phase of transmissions from the base station to the mobile station in a first direction;
(b) determining whether the value of the connection parameter increased or decreased responsive to the transmissions from the base station having the phase changed in the first direction;
(c) generating a second phase change command to request the base station change the phase of the transmissions from the base station to the mobile station in the first direction responsive to a determination that the value of the connection parameter decreased;
(d) generating the second phase change command to request the base station change the phase of the transmissions from the base station to the mobile station in the second direction responsive to a determination that the value of the connection parameter increased; and
(e) repeating steps (b)-(d) until the minimum value of the value of the connection parameter is determined.

10. The method of claim 9, wherein the step of generating further comprises generating the plurality of phase change commands on a command channel between the base station and the at least one mobile station.

11. The method of claim 9, wherein the step of measuring further comprises the step of measuring the phase of transmissions on a communications channel from the base station to the at least one mobile station.

* * * * *